(12) United States Patent
Post

(10) Patent No.: US 6,358,135 B1
(45) Date of Patent: Mar. 19, 2002

(54) DEVICE AND METHOD FOR THE GRIPPING AND RETENTION OF PART OF A SPLIT CARCASS BY THE SPINAL COLUMN

(75) Inventor: Erling Post, Roskilde (DK)

(73) Assignee: Slagteriernes Forskningsinstitut, Roskilde (DK)

( * ) Notice: Subject to any disclaimer, the term of this patent is extended or adjusted under 35 U.S.C. 154(b) by 0 days.

(21) Appl. No.: 09/589,321

(22) Filed: Jun. 7, 2000

(30) Foreign Application Priority Data

Jun. 10, 1999 (DK) .......................... 1999 00819

(51) Int. Cl.[7] .................. A22C 15/00; A22C 18/00; A22C 17/04
(52) U.S. Cl. ...................... 452/171; 452/153
(58) Field of Search ............... 452/171, 135, 452/136, 138, 153

(56) References Cited

U.S. PATENT DOCUMENTS

| | | | |
|---|---|---|---|
| 4,716,626 A | | 1/1988 | Chiron et al. |
| 5,037,349 A | | 8/1991 | Perreault |
| 5,295,898 A | * | 3/1994 | Andre et al. ............... 452/171 |
| 5,494,480 A | * | 2/1996 | Passchier .................... 452/171 |
| 5,611,727 A | | 3/1997 | Dufour et al. |
| 5,725,424 A | | 3/1998 | Dufour et al. |

FOREIGN PATENT DOCUMENTS

| | | | |
|---|---|---|---|
| DK | WO 99/08538 | 2/1999 |
| DK | WO 99/59417 | 11/1999 |
| EP | 714 607 | 6/1996 |
| EP | 0 985 348 | 3/2000 |
| WO | WO 95/17825 | 7/1995 |
| WO | WO 99/04641 | 2/1999 |

* cited by examiner

Primary Examiner—Peter M. Poon
Assistant Examiner—Son T Nguyen
(74) Attorney, Agent, or Firm—Marshall, Gerstein & Borun

(57) ABSTRACT

The invention concerns a device for the gripping and retention of part of a split carcass by the spinal column (17), and the conveyance of that part essentially in the lengthwise direction of the spinal column, while retaining it by the spinal column during processing of the carcass part by means of cutting tools. The device comprises a mainly rectilinear conveyor (10) with retention elements (11) connected as links in an endless chain, with each element having a first section (21) with a contact surface (22) for a first side of the spinal column and a second section (25) with a pressure surface (26) for a second side of the spinal column. The two sections of each element are designed to allow the contact surface (22) and the pressure surface (26) to be relatively moved towards and away from each other in a direction across the conveyor's direction of conveyance. The spinal column can be gradually gripped and clamped between the surfaces (22, 26) when the contact surface (22) and pressure surface (26) are successively, element by element, moved towards each other. The device provides a firm grip between the spinal column and the machine parts of an apparatus for processing of e.g. fore-ends or middles.

13 Claims, 4 Drawing Sheets

DEVICE AND METHOD FOR THE GRIPPING AND RETENTION OF PART OF A SPLIT CARCASS BY THE SPINAL COLUMN

BACKGROUND

1. Field of the Invention

Device and method for the gripping and retention of part of a split carcass by the spinal column.

2. Description of the Prior Art

The present invention relates to a device and a method for the gripping and retention of part of a split carcass by the spinal column and for conveying that part mainly in the lengthwise direction of the spinal column, while retaining it by the spinal column.

After the slaughtering of pigs for instance, the carcass is split and each half is cut into head, fore-end, middle and ham. The middle is separated into loin and belly.

The fore-end, middle and loin contain the split spinal column, which may be removed by a subsequent boning process. A mechanical process for the removal of the spinal column (and the neck bone) from fore-ends is described in Danish patent no. 172.745 B1 (Slagteriemes Forskningsinstitut). In this process, one side of the spinal column is pressed against a guide rail while another side of the spinal column is pushed in the direction of a spiked endless chain conveying the fore-end past tools which cut free the spinal column and cut through the connection to the ribs. Danish patent no. 173.009 B1 (Slagteriernes Forskningsinstitut) describes a further development of that process in which the riblet is cut free mechanically, while the fore-end is conveyed by the spiked chain.

EP 0 714 607 A1 (Stork-Protecon-Langen) describes a machine for sawing off the spinal column (the rib-top) of a middle by means of a tubular saw. The middle is conveyed by means of a belt whose spikes penetrate the spinal column.

SUMMARY OF THE INVENTION

The object of the present invention is to provide a device which is able to grip and retain part of a split carcass by the spinal column and convey that part, while retaining it by the spinal column, with a considerably better hold between the spinal column and the machine sections conveying the part, than that provided by the known processes and machines mentioned above.

The object of the invention is realised in a device which is characterised in that the device comprises a mainly rectilinear conveyor with retention elements, which are connected as links in an endless chain, that each element has a first section with a contact surface for a first side of the spinal column, and a second section with a pressure surface for a second side of the spinal column, and that the two sections of each element are designed to allow contact surface and pressure surface to be relatively moved towards and away from each other in a direction across the conveyor's direction of conveyance.

One of the advantages of the device according to the invention, is that the contact and pressure surfaces of the retention elements can be moved relatively towards each other while the elements are being conveyed by the conveyor, allowing the spinal column to be gradually gripped and clamped between the surfaces. As the operation may be carried out successively, element by element, only relatively small forces are necessary to move the surfaces of each retention element and the sections of an element can be actuated so that a spinal column part is not finally clamped until the spinal column part in front of it has been so. (In the same way, two corresponding sections of a zip can only be coupled when the parts behind have been coupled.) The contact and pressure surfaces of the retention elements can be relatively moved towards each other to previously determined position(s) in which the spinal column is clamped, or one or both sections of the retention elements can be actuated by a force so that the movement stops when the surfaces have built up sufficient pressure on the spinal column to clamp it.

The relative movement of the contact surface and the pressure surface towards and away from each other can be provided by absolute movement of the first section, the second section or both the first and second section of a retention element.

Advantageous embodiments of the device according to the invention are:

Contact surface for the first side of the spinal column may be located on the side of a projection of retention element.

Pressure surface for the second side of the spinal column may be located on surface of a spike.

Contact surface and pressure surface can be relatively moved towards and away from each other, independently of the movement of the corresponding surfaces of neighbouring retention elements.

The device may comprise a mainly rectilinear conveyor with retention elements, which are connected as links in an endless chain, and each retention element may have a first section with two contact surfaces slanting towards each other in an acute angle, for two sides of the spinal column, and a second section designed to allow pressure surface to be moved across the conveyor's direction of conveyance and towards and away from one of the contact surfaces, by which the spinal column can be clamped, and subsequently released from the grip.

Each retention element may comprise a console on which at least one profiled section is fastened, with a contact surface for a first side of the spinal column, and a second contact surface, slanting towards the first surface in an acute angle for a second side of the spinal column.

The two sections may be connected to each other as a hinge, and the pivot axle of the hinge may running essentially in the conveyor's direction of conveyance.

One section may be a fixed section of retention element, whereas the other section may pivot on an axle, running essentially in the conveyor's direction of conveyance.

Each retention element may comprise a console, which is connected to two neighbouring consoles by chain links, the retention elements may be guided by means of a rail, and the retention elements may be driven around continuously using a drive unit actuating chain links or consoles.

The device may comprise a structure running in the lengthwise direction of conveyor which structure, by actuating the first or the second or both sections of retention elements, is designed to cause a relative movement of the contact surface and pressure surface towards or away from each other.

One of the sections of the retention elements may be designed with a sensor which, when actuated by a structure towards one side or the other, moves contact or pressure surface sideways in relation to the conveyor's direction of conveyance.

The method according to the invention is characterised in that the spinal column of part of a split carcass is successively moved to rest against retention elements connected as links in an endless chain of a mainly rectilinear conveyor, the retention elements and the spinal column being moved at an oblique angle towards each other, from a position with a spinal column part near a first section of an element with a contact surface for one side of the spinal column and a second section of the same element with a pressure surface for a second side of the spinal column, to a position where the spinal column part is in contact with contact surface and/or pressure surface of the retention element, that the contact and pressure surfaces of the retention elements are successively moved relatively towards each other in a direction across the conveyor's direction of conveyance, causing a substantial part of the spinal column to be eventually gripped and retained between the contact and pressure surfaces of the elements, and that the part of a split carcass is moved in the conveyor's direction of the conveyance while being retained by the elements.

Advantageous embodiments of the method according to the invention are:

Retention elements, whose pressure surface is located on surface of a spike may be used, and the contact and pressure surfaces may be moved so close towards each other that the spike penetrates the spinal column.

Contact and pressure surfaces may be moved relatively towards and away from each other, independently of the movement of the corresponding surfaces of neighbouring retention elements.

Contact and pressure surfaces may be moved relatively towards each other by swivelling around a common pivot axle, which runs parallel to the conveyor's direction of conveyance.

In the present description a (carcass) part means especially the fore-end, loin and middle of a pig carcass. However, the invention may also be applied to other (carcass) parts, especially those of cattle, sheep, goats and similar carcasses.

During retention of part of a split carcass by the spinal column the carcass part may be processed by means of cutting tools, e.g. saws and knives separating meat and bone in for-ends or middles.

BRIEF DESCRIPTION OF THE SEVERAL VIEWS OF THE DRAWINGS

The invention is described in detail below with reference to the drawings in which FIG. 1 schematically shows an apparatus (viewed from above) for cutting free the spinal column and the riblet of fore-ends, with a conveyor according to an embodiment of the invention.

DETAILED DESCRIPTION OF THE PREFERRED EMBODIMENTS

Figure 1:
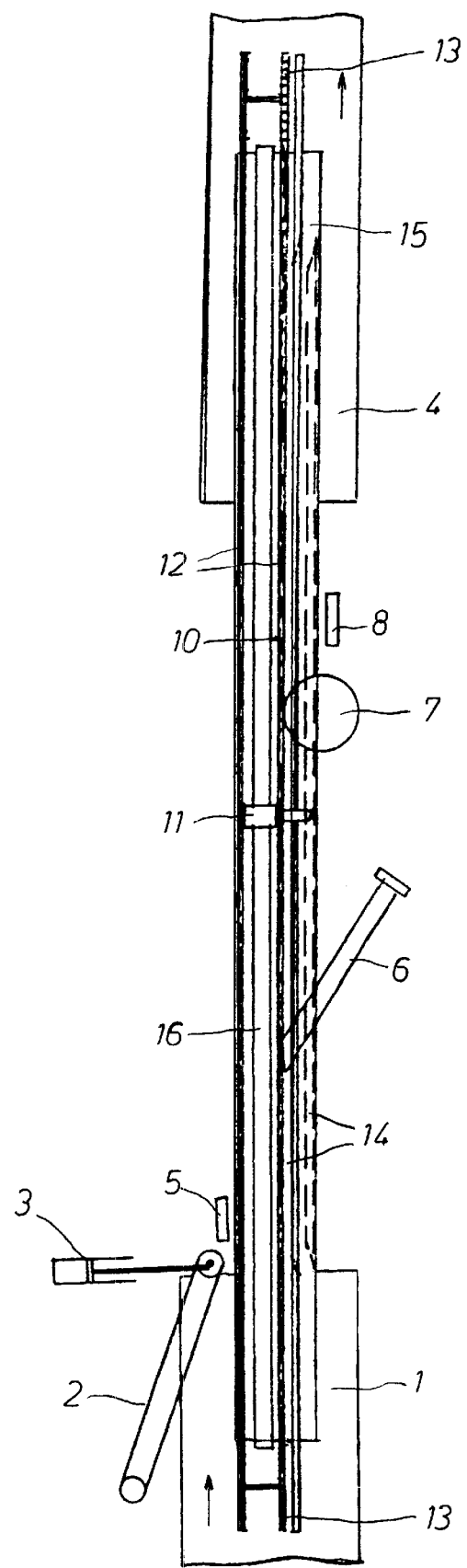

The apparatus of FIG. 1 comprises a feeding belt 1, a vertical pressure belt 2 with an air cylinder 3 and an exit belt 4. Between feeding belt 1 and exit belt 4 various tools are fitted, including in particular a knife 5 for cutting free the meat from the side of the spinous processes and the top side of the spinal column of a fore-end, a riblet knife 6 for cutting along the lower side of the ribs, a rib saw 7 for cutting through the heads of the ribs and a knife 8 for cutting free one side of the spinal column. The tools and their functions are described in detail in Danish patent nos. 172.745 B1 and 173.009 B1.

Above the tools, feeding belt and exit belt, a line conveyor 10 of the present construction is fitted. It is designed for successively gripping the spinal column of a fore-end being conveyed by feeding belt 1, retaining the fore-end by the spinal column and conveying the fore-end thus retained past the tools with the secure positioning of the spinal column in relation to the tools.

The conveyor comprises many retention elements 11, of which only one is shown in FIG. 1. The elements are connected in an endless loop by means of two continuous chains 12. These are run on two pairs of cogwheels 13, of which one pair is driven by a motor not shown in the drawing.

Figure 2:
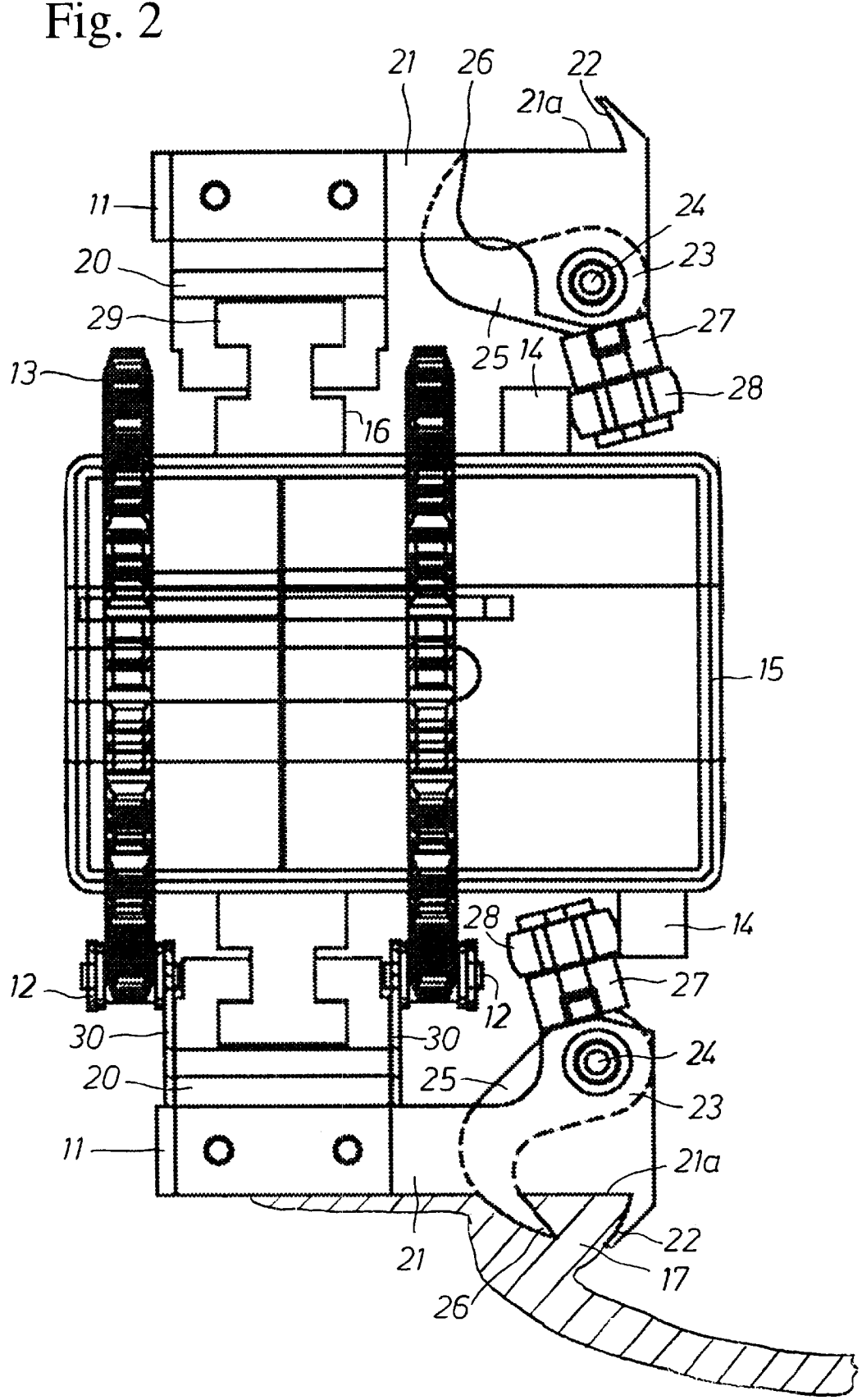
FIG. 2 shows the conveyor in FIG. 1 viewed from the rear.
Figure 3:
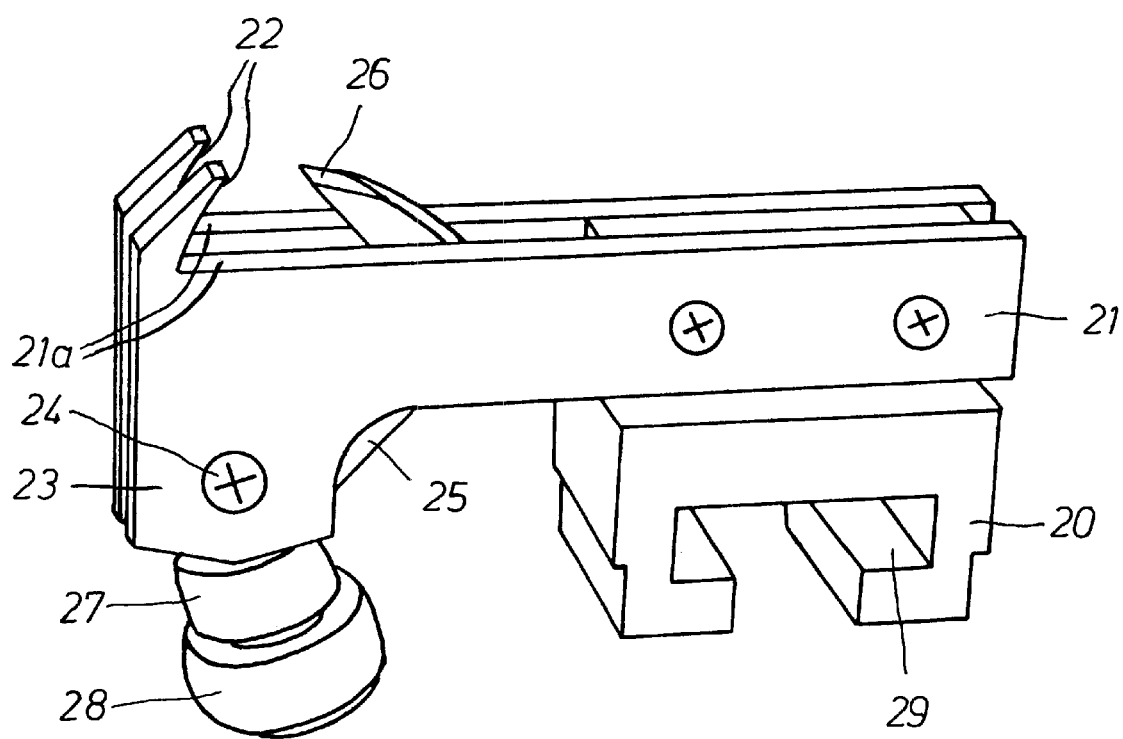
FIG. 3 shows a perspective view of a retention element in the conveyor.

The design of the retention elements is shown in more detail in FIGS. 2 and 3. Two recesses are cut in a glide shoe 20, in which two contour-cut plates 21 are placed. The plates are clamped to the glide shoe by means of bolts going through the section between the recesses. On one side, the plates 21 have a tapering projection with a contact surface 22 slanting towards the side of the glide shoe in an acute angle. On the side opposite the projection is a plate section 23, with a boring in which a through-going axle 24 is fitted, connecting the plates 21. A third contour-cut plate 25, is sited on the axle between the two plates 21. The plate 25 can pivot on the axle 24. The plate 25 is designed with a double-grinded spike, the surface 26 of which functions as a contact surface. The spike slants in the direction of projections of the two other plates 21. When plate 25 pivot anti-clockwise on the axle 24, the spike on plate 25 and the opposite projections on the two other plates 21 act as a kind of pliers able to grip and retain a part of spinal column 17 between them. In this connection, the function of plate side 21a below the slanting projections with contact surface 22 is to guide the spinal column part towards the projections and retain it in a squeezing grip between the surface 26 of the spike and the surfaces 22 of the projections.

A spacer 27 is fitted to plate 25 and has an axle, which is essentially perpendicular to axle 24, which goes through plates 21 and 25. A roller 28 runs on the axle of the plate 25. It is actuated on one side or the other by pressure rails 14 (FIG. 2), mounted to a square tube 15 inside the endless loop formed by elements 11.

When roller 28 is actuated on one side, as shown at the bottom of FIG. 2, the pressure surface 26 of the spike approaches the contact surface 22 of projections of the two other plates 21, causing a part of spinal column 17 between the spike and the projections to be pushed along plate sides 21a below the slanting projections, and then be gripped and retained very securely by the surface 26 of the spike and the surfaces 22 of the projections. Pressure rail 14 is sited so that spike on plate 25 is inserted well into the bone.

When the roller is actuated on the other side as shown at the top of FIG. 2, spike on the plate 25 moves away from projections on the two other plates 21, increasing the distance between the projections and the spike. The retained spinal column part is released.

The location of the pressure rails is also shown in FIG. 1, where the location of the rails on the lower side of the square tube is shown with dashed lines. At the shift from one rail to the other the rails are cut in an oblique angle, with the distance between the cutting surfaces being a little more than the diameter of roller 28 (to allow the roller to pass through).

Glide shoe 20 has a T-shaped recess 29 (FIGS. 2 and 3), the purpose of which is to guide retention element 11 on a corresponding rail 16, which extends around the square tube 15 in the lengthwise direction of the tube. Glide shoe 20 may be made of a (plastic) material that produces little friction, or the T-shaped recess 29 may be coated with a friction-reducing material. Alternatively, rollers or balls may be provided in the recess 29 or on the rail 16, in order to reduce the friction between glide shoe and rail.

Two thin plates 30 are clamped to the sides of the glide shoe, connecting retention element 11 to one or more links in the two circulating chains 12. The chains drive the elements continuously round on rail 16, which passes through the T-shaped recess 29. Element 11 is fitted for each 4–8 cm of the chain.

Feeding belt 1 (FIG. 1) is slanting upward—viewed in the direction of conveyance—and is spring-actuated at the down-stream end. When a fore-end with the split surface pointing upwards and the rear cutting plane lying first is conveyed forward towards the supply end of conveyor 10, belt 1 will convey the spinal column upward at an angle until it has contact with the horizontal lower sides 21a of retention elements 11. At the same time, vertical belt 2 with air cylinder 3 will push the fore-end sideways until the spinal column has contact with surfaces 22 of the projections. Elements 11 and feeding belt 1 are conveyed at approximately the same speed.

When the spinal column 17 has advanced a little further in the conveyor's direction of conveyance, pressure rail 14 on the right hand side of square tube 15 takes over (bottom of FIG. 2). Plate 25 of a retention element is then actuated to turn so that the part of the spinal column 17 opposite it is first gripped and then retained by the spike pushing some way into spinal column 17. The element now retains the rear end of the spinal column.

When, a little later on, the next retention element meets the transient section of pressure rail 14, the part of the spinal column lying behind the first part is gripped by this element and the part is immediately thereafter clamped in the same way as with the first retention element. The elements continue one by one to grip and retain a new spinal column part until the spinal column 17 is retained almost in its full length (in the same way as closing a zip).

One of the advantages of gripping the spinal column successively is that it is gradually straightened as the elements clamp the spinal column parts.

Conveyor 10 then moves the fore-end past the tools with a firm grip of the spinal column, thus ensuring a steady position of the spinal column in relation to the retention elements. The tools can operate precisely in relation to the fore-end, when the position of an anatomical point such as the first rib is detected at a given time and compared with the distance over which the elements have conveyed the fore-end since the time in question.

When the fore-end has been through all the cutting processes, only the spinal column (including the neck bone) is left in the conveyor. Pressure rail 14 on the left hand side of the square tube 15 takes over, releasing the grip on the spinal column, and the spinal column falls down at the end of the conveyor.

Underneath the conveyor 10, there are devices for the collection and removal of fore-end parts cut off by the tools, i.e. the riblet and the fore-end without surface bones (spinal column and ribs). Exit belt 4 conveys the fore-end for further boning and processing.

The conveyor may contain several fore-ends at a time, provided the distance between them is large enough for each tool to finish its operating cycle on one fore-end, before the next fore-end is processed.

The device described above is designed for right hand side shoulders. Left hand side fore-ends are processed by a similar device with a mirror symmetric structure.

Figure 4:
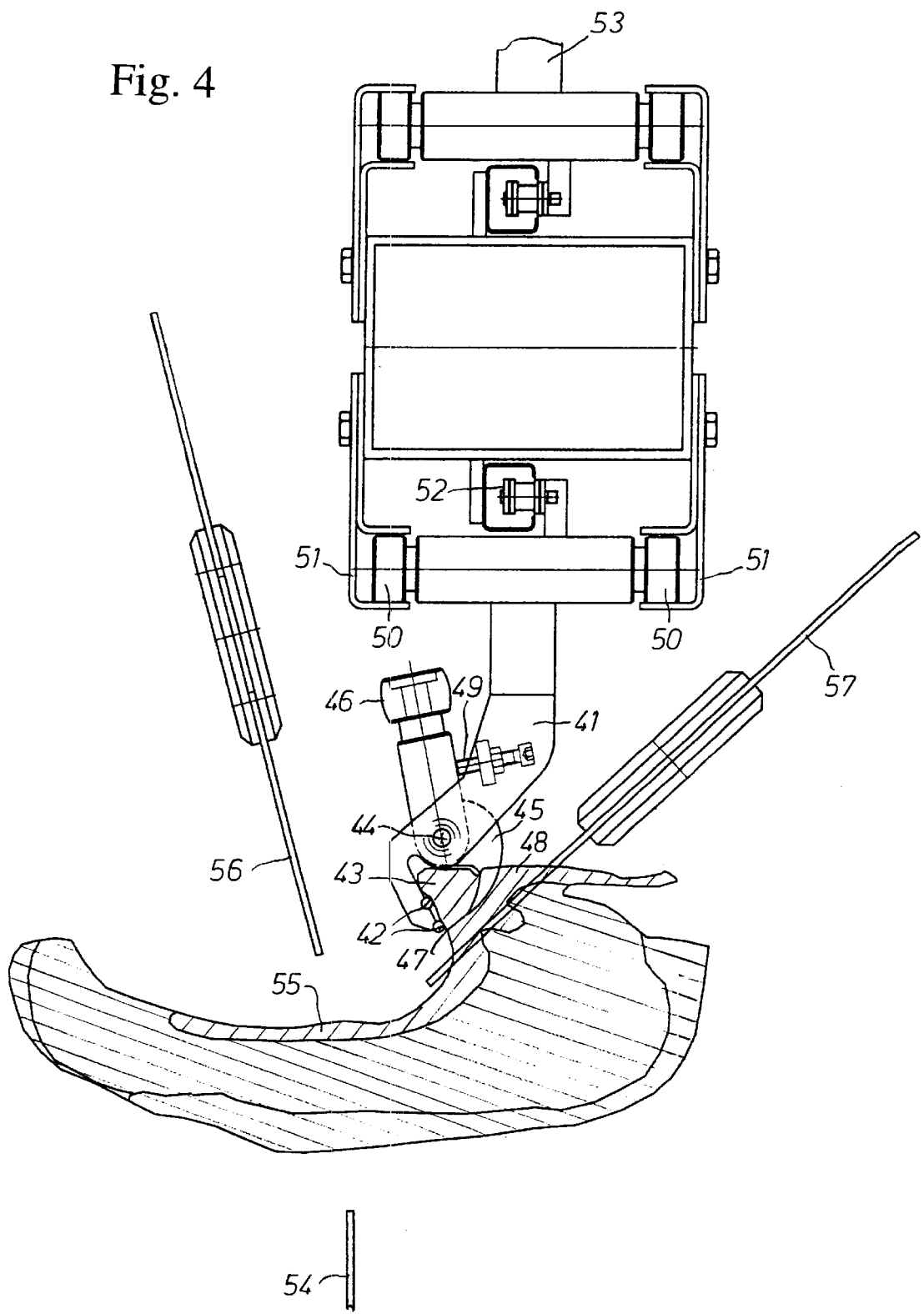
FIG. 4 shows part of an apparatus for the treatment of middles.

The sectional diagram in FIG. 4 of an apparatus for the processing of middles shows a conveyor with differently designed gripping and retaining elements for the spinal column part. The conveyor and its elements are specially designed to grip and retain middles by the spinal column and convey the retained middles past cutting tools.

The conveyor is designed for right hand side middles being conveyed with the cut surface to the fore-end in front.

Each element in the conveyor comprises two contoured plates 41 with a contact surface 42 for one side of a spinal column 43. The plates 41 are placed at a distance from each other and have a boring in which an axle 44 is placed. A pivot section in the form of another contoured plate 45 with a roller 46 corresponding to the roller in FIGS. 2 and 3, is placed on this axle between plates 41. The other contoured plate 45 has a pressure surface 47 on a spike part. This spike penetrates the (splitting) side 48 of a spinal column when plate 45 is forced clockwise by a rail not shown in the figure. A stop 49 limits the movement. In the same way as the conveyor in FIG. 1, the conveyor has a second rail that turns plate 45 anti-clockwise, causing spike with pressure surface 47 to be withdrawn from the spinal column and releasing that part of the spinal column.

By means of two rollers 50, the retention element runs in a rail system 51, forming a continuous run. The element runs in the system together with other, similarly designed elements, and is driven forward by a chain arrangement 52. Part of a returning element 53 is shown at the top of FIG. 4.

The retention elements grip and retain the spinal column of a middle in essentially the same way as explained in connection with FIGS. 1–3, however, with the difference that the elements only have a contact surface 42 for one side of the spinal column (the lower side 43). This surface is provided on two pins connecting contoured plates 41. During feeding, the middle is moved towards surface 42, so that at least one of the pins settles naturally in an anatomic part of the spinal column. When the spinal column is subsequently clamped by spike on the plate 45, a positioning is thus achieved which is determined by the anatomic area (and not by splitting plane 48, which may be unreliable as a reference).

Once clamped, the middle is conveyed past circular knife 54, which cuts up to ribs 55, and then past a circular saw 56, which saws through the ribs, causing the belly part of the middle to fall onto an underlying conveyor belt. Finally, the spinal column is cut through by means of a second circular saw 57. The loin falls onto a conveyor belt and is conveyed for further processing. The spinal column (the rib-top) remains on the conveyor and is released from the grip of the elements, which is achieved by the withdrawal of the spike of plate 45 from the spinal column. After withdrawal, the retention elements start their return run, which takes place in the run at the top of FIG. 4.

What is claimed is:

1. A device for the gripping and retention of a part of a split carcass by spinal column (17) and for conveying said part mainly in a lengthwise direction of spinal column, while retaining said part by the spinal column, wherein the device comprises a mainly rectilinear conveyor (10) with retention clement (11) having a first section (21) with a contact surface (22) for a first side of the spinal column and a second section

(25) with a pressure surface (26) for a second side of the spinal column, and the first and second sections of each said retention element allowing said contact surface (22) and said pressure surface (26) to be relatively moved towards and away from each other in a direction across a direction of conveyance of said conveyor, and further comprising a structure (14) running in the lengthwise direction of the conveyor (10), which structure by actuating the first or second or both sections of the retention elements (11), causes a relative movement of the contact surface (22) and the pressure surface (26) towards or away from each other.

2. The device of claim 1, wherein said contact surface (22) for the first side of the spinal column is located on a side of a projection of one of the retention elements (11).

3. The device of claim 1, wherein said pressure surface (26) for the second side of the spinal column is located on a surface of a spike.

4. The device of claim 1, wherein said contact surface (22) and pressure surface (26) can be relatively moved towards and away from each other, independently of the movement of the corresponding surfaces of neighboring retention elements (11).

5. The device of claim 1, wherein the device comprises a mainly rectilinear conveyor with retention elements (11), which are connected as links in an endless chain, each of said retention elements (11) having a first section (21) with two contact surfaces (21a, 22) slanting towards each other in an acute angle, for two sides of the spinal column, and a second section (25) allowing the pressure surface (26) to be moved across the conveyor's direction of conveyance and towards and away from one of the contact surfaces (21a, 22), by which the spinal column can be clamped, and subsequently released from the grip.

6. The device of claim 1, wherein each of said retention elements comprises a console (20) on which at least one profiled section (21) is fastened, with a contact surface (22) for a first side of the spinal column, and a second contact surface (21a), slanting towards the first surface in an acute angle for a second side of the spinal column.

7. The device of claim 1, wherein the two sections (21, 25) are connected to each other as a hinge, and a pivot axle (24) of the hinge is running in the conveyor's direction of conveyance.

8. The device of claim 1, wherein said first section (21) is a fixed section of retention element (11), whereas the second section (25) can pivot on an axle (24), running in the conveyor's direction of conveyance.

9. The device of claim 1, wherein each of said retention elements (11) comprises a console (20), which is connected to two neighbouring consoles by a plurality of chain links (12), the retention elements are guided by means of a rail (16), and the retention elements being driven around continuously using a drive unit actuating chain links (12) or consoles (20).

10. The device of claim 1, wherein one of the sections (25) of the retention elements includes a sensor (27, 28) which, when actuated by the structure (14) towards one side or the other, moves contact or pressure surface (22, 26) sideways in relation of the conveyor's direction of conveyance.

11. A method for the gripping and retention of a part of a split carcass by the spinal column (17), and the conveyance of said part mainly in a lengthwise direction of the spinal column, while retaining the part by the spinal column, comprising the steps of successively moving the spinal column (17) of a split carcass to rest against retention elements (11) connected as links in an endless chain of a mainly rectilinear conveyor (10), moving the retention elements (11) and the spinal column at an angle towards each other, from a position with a spinal column part near a first section (21) of an element (11) with a contact surface (22) for one side of a spinal column and a second section (25) of the same element with a pressure surface (26) for a second side of a spinal column, to a position where the spinal column part is in contact with one of the contact surface (22) and the pressure surface (26) of the retention element, successively moving the contact and pressure surfaces (22, 26) of the retention elements relatively towards each other in a direction across the conveyor's direction of conveyance by swivelling around a pivot axle (24), which runs parallel to the conveyor's direction of conveyance, whereby a substantial part of the spinal column is eventually gripped and retained between the contact and pressure surfaces of the elements (11), and moving the part of a split carcass in the conveyor's direction of the conveyance while said part is retained by the elements (11).

12. The method of claim 11, wherein retention elements (11), whose pressure surface (26) is located on surface of a spike are used, and further comprising the step of moving the contact and pressure surfaces (22, 26) sufficiently close towards each other that the spike penetrates the spinal column (17).

13. The method of claim 11, further comprising the step of moving said contact and said pressure surfaces (22, 26) relatively towards and away from each other, independently of the movement of the corresponding surfaces of neighbouring retention elements (11).

* * * * *